DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED FEBRUARY 23, 1971

884 O.G. 1323

T883,024

PROCESS FOR THE SUSPENSION POLYMERIZATION OF VINYL CHLORIDE

Samuel V. Abramo, 307 Concord Ave., McDaniel Crest 19803, and Norman P. Rockwell, 9 Walnut Ridge Road 19807, both of Wilmington, Del.

Continuation of application Ser. No. 657,419, July 31, 1967. This application Mar. 17, 1970, Ser. No. 24,967

Int. Cl. C08f *1/11, 15/24*

U.S. Cl. 260—87.1

1 Sheet Drawing. 10 Pages Specification

A suspension polymerization process for vinyl chloride homopolymer and copolymers with, e.g. vinyl acetate, vinylidene chloride and propylene. The process involves heating with agitation a suspension of the monomer or monomers in water containing a suspending agent and up to 0.075% by weight based on monomer of alpha, alpha′-azobis(alpha,gamma-dimethylvaleronitrile) initiator, at a temperature of 35–65° C., preferably 45–55° C. The rate of polymerization obtained is greater than the rate obtained with ten times the equivalent amount of lauroyl peroxide initiator. The resulting polymers provide films and sheets with greater thermostability than those obtained with lauroyl peroxide initiator.

Feb. 23, 1971 S. V. ABRAMO ET AL T883,024
PROCESS FOR THE SUSPENSION POLYMERIZATION OF VINYL CHLORIDE
Original Filed July 31, 1967
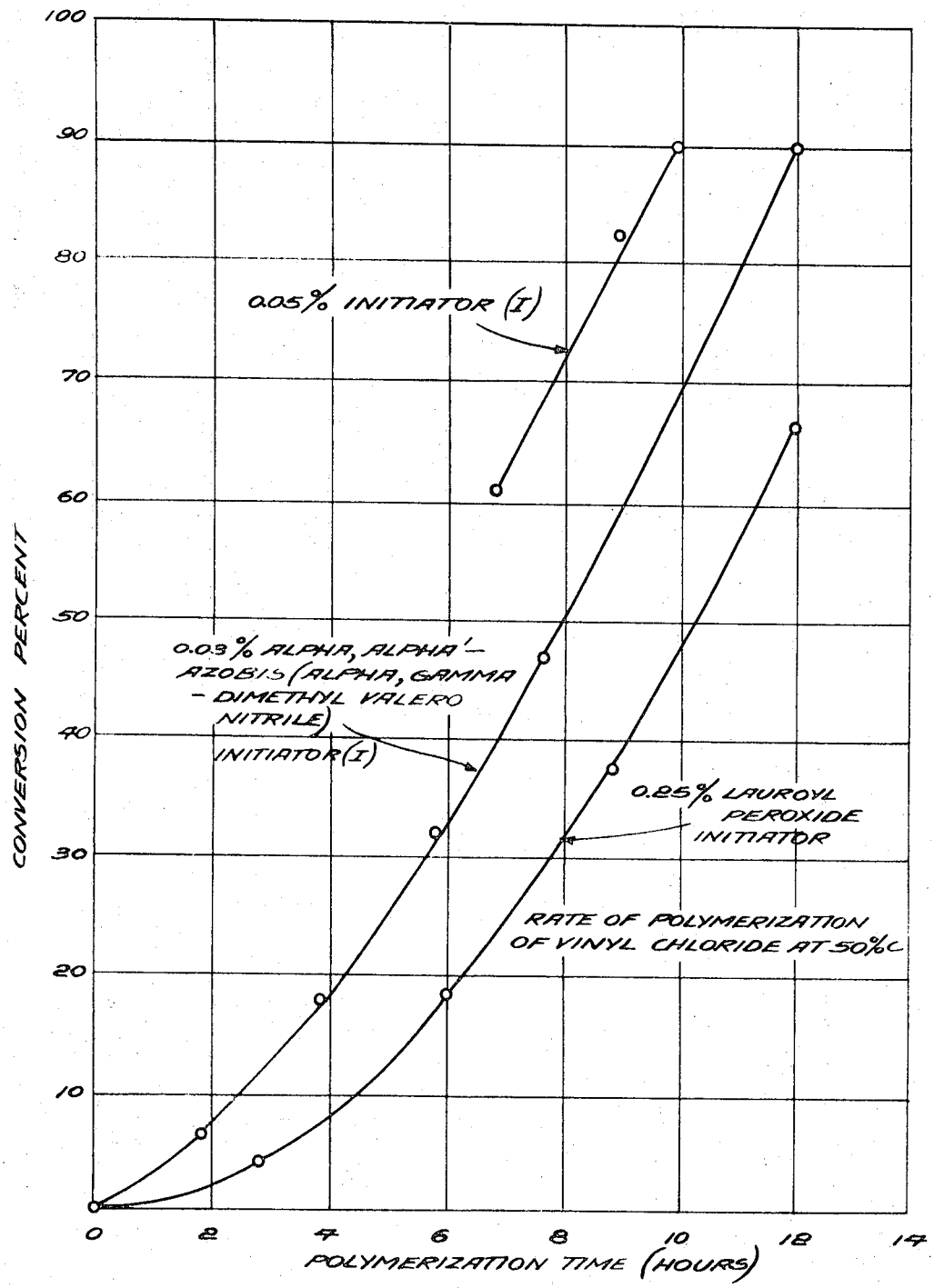
INVENTORS
N.P. ROCKWELL,
S.V. ABRAMO,
BY Alvin S. Bass
AGENT